United States Patent Office 3,282,785
Patented Nov. 1, 1966

3,282,785
3 - KETO - 4,9 - DIENIC-11β-HYDROXY-19-NOR STEROIDS USEFUL IN THE TREATMENT OF HYPERCHOLESTEROLEMIA
Robert Joly, Montmorency, Julien Warnant, Neuilly-sur-Siene, and Jean Jolly, Clichy-sous-Bois, France, assignors to Roussel-UCLAF, Paris, France, a corporation of France
No Drawing. Filed June 5, 1964, Ser. No. 373,048
Claims priority, application France, July 10, 1963, 941,004; Oct. 22, 1963, 951,379; Jan. 17, 1964, 960,726
18 Claims. (Cl. 167—65)

The present invention relates to new dienic 11-oxygenated steriods, the novel process of preparing these compounds and their utilization. It more particularly relates to 4,9-dienic-11β-hydroxy-19-nor steroids, the novel process of oxidizing 3-keto-5(10),9(11)-dienic-19-nor steroids under gentle conditions to obtain 11-oxygenated products and the utilization of these products.

The present invention comprises 11β-hydroxy steroids of the formula

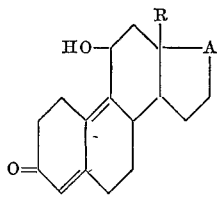

wherein R is a lower alkyl, particularly methyl, ethyl, propyl, isopropyl and A is a divalent linkage selected from the group consisting of

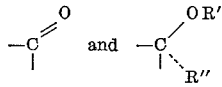

R' is a member selected from the group consisting of hydrogen and the acyl radical of an organic carboxylic acid having from 1 to 18 carbon atoms and R" is a member selected from the group consisting of hydrogen, lower alkyl, lower alkenyl, lower alkynyl and chlorinated lower alkynyl, particularly methyl, ethyl, vinyl, ethynyl or chloroethynyl.

It is well known that the introduction of an oxygen in the 11 position by chemical methods, generally causes considerable difficulties. This is a problem which plays a large part both in ordinary preparations as well as in total synthesis of the steroids. In certain cases this question has been solved by microbiological oxidation, which requires special equipment. With reference to the known chemical methods of introducing an oxygenated function in the 11 position, they are not numerous and do not always give satisfaction from the standpoint of yields. For instance, the action of the per acids on 9,11-dehydro steroids results only in a 9,11-epoxide. Similarly, the action of hypobromous acid on a 9,11-dehydro steroid introduces into the steroid molecule a frequently undesirable halogen which must subsequently be eliminated.

An object of the present invention is the production of 11β-hydroxy steroids selected from the group consisting of compounds of the formula

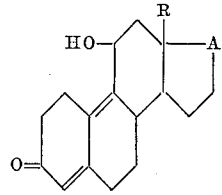

wherein R is a lower alkyl and A is a divalent linkage selected from the group consisting of

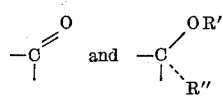

R' is a member selected from the group consisting of hydrogen and the acyl radical of an organic carboxylic acid having from 1 to 18 carbon atoms and R" is a member selected from the group consisting of hydrogen, lower alkyl, lower alkenyl, lower alkynyl and chlorinated lower alkynyl.

A further object of the invention is the development of a process for the production of 11β-hydroxy steroids selected from the group consisting of compounds of the formula

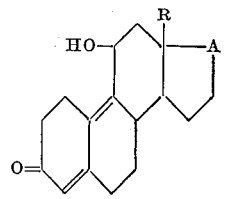

wherein R is a lower alkyl and A is a divalent linkage selected from the group consisting of

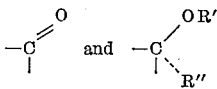

R' is a member selected from the group consisting of hydrogen and the acyl radical of an organic carboxylic acid having from 1 to 18 carbon atoms and R" is a member selected from the group consisting of hydrogen, lower alkyl, lower alkenyl, lower alkynyl and chlorinated lower alkynyl which comprises the steps of oxidizing a compound of the formula

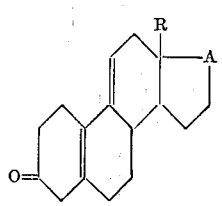

wherein R and A have the above-noted meanings by the action of an oxygen-containing gas in the presence of a weakly alkaline media in an inert organic solvent, reducing the compound of the formula

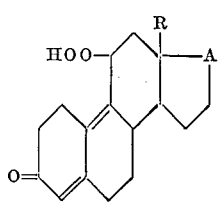

wherein R and A have the above-noted meanings by the action of a weak reducing agent in an inert organic solvent, and recovering said 11β-hydroxy steroids.

A further object of the invention is the development of a process for treatment of hypercholesterolemia which comprises administering a safe but effective dose of an 11β-hydroxy steroid selected from the group consisting of compounds of the formula

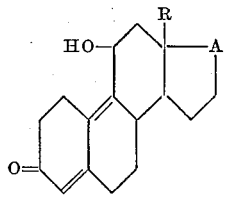

wherein R is a lower alkyl and A is a divalent linkage selected from the group consisting of

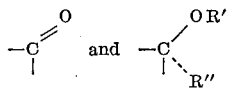

R' is a member selected from the group consisting of hydrogen and the acyl radical of an organic carboxylic acid having from 1 to 18 carbon atoms and R" is a member selected from the group consisting of hydrogen, lower alkyl, lower alkenyl, lower alkynyl and chlorinated lower alkynyl.

These and other objects of the invention will become more apparent as the description thereof proceeds.

It has been unexpectedly found, and this represents part of our invention that, contrary to other steroids, particularly 9,11-dehydro steroids which do not contain a 5,10 double bond, the oxidation of 3-oxo $\Delta^{5(10),9(11)}$ 19-nor steroids in weakly alkaline medium by the action of an oxygen-containing gas leads to 11β-hydroperoxides without producing an attack on the doubly-activated methylene in the 4 position. The oxidation in the 11 position in the present invention presents no analogy with the oxidation in the 4 position of 3-oxo steroids, where a potassium enolate is oxidized by oxygen.

The 11β-hydroperoxy 19-nor steroids obtained by the process of the invention, are easily reducible into the corresponding carbinols by weak reducing agents.

The process of the invention is shown by the flow diagram of Table I hereafter.

TABLE I

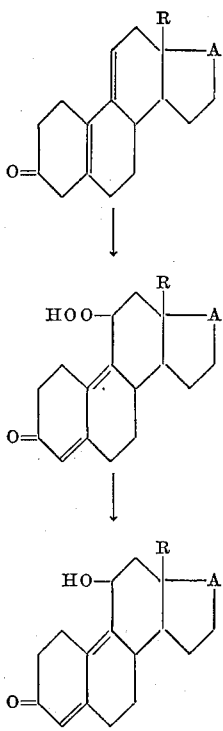

R and A have the above-noted meanings.

The process according to the inventions is, therefore, essentially characterized in that a 3-oxo $\Delta^{5(10),9(11)}$ gonadiene of Formula I

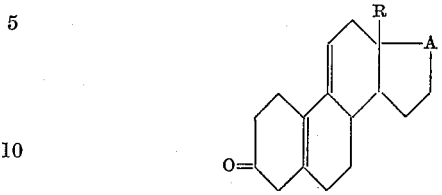

wherein R and A have the above-noted meanings, is oxidized with the aid of an oxygen-containing gas such as oxygen or air, the oxidation being conducted in a weakly alkaline media in an inert organic solvent. A 17-substituted 3-oxo-11β-hydroperoxy-$\Delta^{4,9}$-gonadiene of Formula II

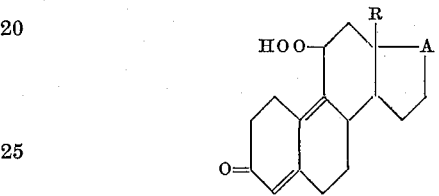

wherein R and A have the above-noted meanings, is recovered. A weak reducing agent is reacted with this last compound, and the corresponding 11β-hydroxyl derivative of Formula III

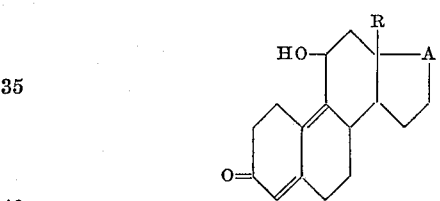

wherein R and A have the above-noted meanings, is obtained.

As stated previously, R represents in the preceding formulas a lower alkyl radical, especially methyl, ethyl, propyl or isopropyl, and A represents >C=O or

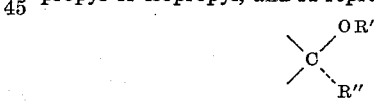

where R' is hydrogen or an acyl radical of an organic carboxylic acid containing 1 to 18 carbon atoms, especially the acetyl radical or the benzoyl radical; R" is hydrogen or a lower aliphatic hydrocarbon radical, substituted or non-substituted, saturated or non-saturated, especially ethynyl, chloroethynyl, vinyl, methyl or ethyl.

The weak alkalinity of the oxidation media can be ensured by the presence in said media of a tertiary aliphatic amine, as a tri-lower-alkyl-amine such as triethylamine, or a tertiary cyclic amine, as for example, pyridine or even an organic acid derivative of quaternary ammonium compound, such as tetramethyl ammonium acetate or benzyl trimethyl ammonium acetate.

It is advantageous to effect the oxidation in an inert organic solvent such as a lower alkanol, for example, methanol or ethanol, or in an N,N-di-lower-alkyl-lower-alkanoyl-amide, such as dimethylformamide, or also in a mixture of these two.

In order to effect the reduction with a weak reducing agent, preferably a tri-lower-alkyl phosphite is utilized, such as trimethyl phosphite, and the reaction is conducted in an inert organic solvent, preferably a lower alkanol, such as methanol or ethanol. The reduction may also be effected by action of an alkali metal iodide, such as potassium iodide, in the presence of a lower alkanoic acid such as acetic acid, or by other weak reducing agents. After the reduction is accomplished, any excess reducing agent is preferably destroyed before further recovery steps.

No critical temperature limitations are necessary; both the oxidation and reduction are advantageously conducted at ambient temperatures.

As it can be noted, the starting compounds of Formula I, when

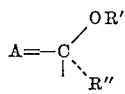

can be esterified in the 17β-position. Utilization of such esters results in obtention of compounds of Formula III esterified in the 17β-position with an organic carboxylic acid having from 1 to 18 carbon atoms.

The organic carboxylic acids having from 1 to 18 carbon atoms are those of aliphatic or cycloaliphatic, saturated or unsaturated carboxylic acids or those of aromatic or heterocyclic carboxylic acids: For example, alkanoic acids, such as formic acid, acetic acid, propionic acid, butyric acid, isobutyric acid, valeric acid, isovaleric acid, trimethylacetic acid, caproic acid, β-trimethylpropionic acid, oenanthic acid, caprylic acid, pelargonic acid, capric acid, undecylic acid, lauric acid, myristic acid, palmitic acid, stearic acid; alkenoic acids, such as undecylenic acid, oleic acid; cycloalkanoic acids, such as cyclopentyl-carboxylic acid, cyclopropyl-carboxylic acid, cyclobutyl-carboxylic acid, cyclohexyl-carboxylic acid; cycloalkyl-alkanoic acids, such as cyclopropylmethyl-carboxylic acid, cyclobutylmethyl-carboxylic acid, cyclopentylethyl-carboxylic acids, cyclohexylethyl-carboxylic acid; aryl-alkanoic acids, such as phenylacetic acid, phenylpropionic acid; benzoic acid; phenoxyalkanoic acids, such as phenoxyacetic acid, p-chlorophenoxyacetic acid, 2,4-dichlorophenoxyacetic acid, 4-t.-butylphenoxyacetic acid, 3-phenoxypropionic acid, 4-phenoxybutyric acid; heterocyclic-carboxylic acids, such as furane-2-carboxylic acid, 5-t.-butyl-furane-2-carboxylic acid, 5-bromofurane - 2 - carboxylic acid, nicotinic acid; β-ketocarboxylic acids, such as acetylacetic acid, propionylacetic acid, butyrylacetic acid; aminoacids, such as diethylaminoacetic acid, aspartic acid, etc.

By the process of the invention, 11β-hydroxy steroids selected from the group consisting of compounds of the formula

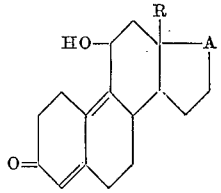

wherein R is a lower alkyl and A is a divalent linkage selected from the group consisting of

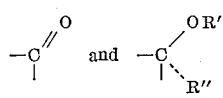

R' is a member selected from the group consisting of hydrogen and the acyl radical of an organic carboxylic acid having from 1 to 18 carbon atoms and R'' is a member selected from the group consisting of hydrogen, lower alkyl, lower alkenyl, lower alkynyl and chlorinated lower alkynyl, can be obtained in good yields. In particular the following novel 11β-hydroxy steroids can be obtained:

(a) Δ⁴,⁹-estradiene-11β-ol-3,17-dione,

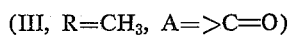

(b) Δ⁴,⁹-estradiene-11β,17β-diol-3-one,

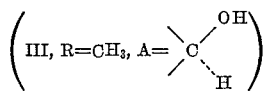

(c) 17β-benzoyloxy-Δ⁴,⁹-estradiene-11β-ol-3-one

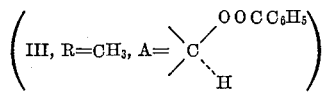

(d) 17α-ethynyl-Δ⁴,⁹-estradiene-11β,17β-diol-3-one

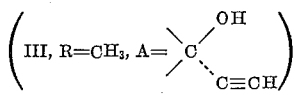

(e) 17α-methyl-Δ⁴,⁹-estradiene-11β,17β-diol-3-one

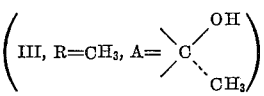

(f) 17α-ethyl-Δ⁴,⁹-estradiene-11β,17β-diol-3-one

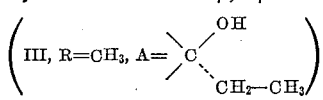

Obviously, however, other compounds of Formula III can be prepared, particularly those where R is ethyl, n-propyl or isopropyl.

The compounds of Formula III, obtained by the process of the invention, show interesting physiological properties. In particular, they possess an important hypocholesterolemic action.

In addition, these new compounds represent valuable intermediate products for the steroid syntheses. Δ⁴,⁹-estradiene-11β-ol-3,17-dione (III, R=CH₃, A=>C=O), for instance, can serve as an intermediate for the preparation of the 11β-hydroxy estrone, according to the process described in United States Patent No. 3,056,811.

The starting compounds, the 3-oxo-Δ⁵(¹⁰),⁹(¹¹) derivatives of Formula I, can be prepared, for example, by employing the method described in United States Patent No. 3,052,672, by the action of the pyrrolidine on the corresponding 4,5-seco-Δ⁹-3,5-dioxo derivative or the corresponding Δ⁴,⁹-3-oxo derivative, followed by treatment of the obtained enamine with acetic acid. The preparation of Δ⁵(¹⁰),⁹(¹¹)-estradiene-3,17-dione is described later on in detail as simply indicative of one such method.

The following examples of the introduction of a hydroxyl in the 11 position on certain steroid derivatives illustrate the invention, but do not present any limitative characteristics. It is to be understood that the new process can be applied to other steroids of Formula I, especially to those carrying different alkyl substitutes in the 13 position (R=lower alkyl other than methyl), without departing from the body of the invention.

PREPARATION OF Δ⁵(¹⁰),⁹(¹¹) - ESTRADIENE - 3,17-DIONE (COMPOUND I, R=CH₃ AND A=>C=O)

20 g. of 4,5-seco-Δ⁹(¹⁰)-estrene-3,5,17-trione were introduced into 100 cc. of methanol under total darkness and under atmosphere of nitrogen. 10 cc. of pyrrolidine were added over a period of five minutes and the reaction mixture was allowed to stand overnight.

Thereafter, the mixture was cooled to −10° C. The precipitate was vacuum filtered, washed with methanol, cooled to −10° C., and dried under vacuum. 21.8 g. of 3-pyrrolidino-Δ³,⁵(¹⁰),⁹(¹¹)-estratriene - 17 - one were obtained. The product had a melting point of 175–176° C. and a specific rotation [α]$_D^{20}$=+500°±5° (c.=0.5% in dimethylformamide).

The product was insoluble in water, slightly soluble in alcohol, ether and acetone, and soluble in benzene and chloroform.

*Analysis.*—$C_{22}H_{29}ON$; molecular weight=323.46—Calculated: C, 81.69%; H, 9.04%%; N, 4.33%. Found: C, 81.7%; H, 9.1%; N, 4%.

This compound is not described in the literature.

45 cc. of acetic acid were mixed with 900 cc. of water under an atmosphere of nitrogen and under total darkness, then 30 g. of 3-pyrrolidino-$\Delta^{3,5(10),9(11)}$-estratriene-17-one were added and the reaction mixture was stirred for 16 hours at room temperature. The mixture was cooled at about 0° C. Then a stream of nitrogen was allowed to bubble through the suspension obtained. The suspension was then vacuum filtered, washed with water, dried under vacuum, and 23.8 g. of product were obtained.

This crude product was dissolved in two volumes of hot ethanol under an atmosphere of nitrogen. The solution was cooled to about −10° C. The precipitate was vacuum filtered, washed with ethanol, cooled to −10° C., and dried under vacuum. $\Delta^{5(10),9(11)}$-estradiene-3,17-dione having a melting point of 104° C. and a specific rotation $[\alpha]_D^{20}=+339°\pm3.5°$ (c.=0.5% in methanol), was obtained with a yield of 86% on the recrystallization.

The product occurred in form of white prismatic needles, insoluble in water and soluble in acetone, benzene and chloroform.

*Analysis.*—$C_{18}H_{22}O_2$; molecular weight=270.36—Calculated: C, 79.96%; H, 8.20%. Found: C, 80.2%; H, 8.20%.

This compound is not described in the literature.

Example I

PREPARATION OF $\Delta^{4,9}$-ESTRADIENE-11β-OL-3,17-DIONE (III, R=CH₃; A=>C=O)

*Step A: Oxidation.*—10 g. of $\Delta^{5(10),9(11)}$-estradiene-3,17-dione, I, with R=CH₃ and A=>C=O, were dissolved in 100 cc. of absolute ethanol and 0.1 cc. of triethylamine. A stream of oxygen was allowed to bubble through the solution for a period of 4 hours. The resulting suspension was cooled to about −10° C. under an atmosphere of oxygen for 1 hour.

The precipitate was vacuum filtered, washed with ethanol cooled to −10° C., and dried at about 40° C. 8.5 g. of 11β-hydroperoxy-$\Delta^{4,9}$-estradiene-3,17-dione (II, R=CH₃ and A=>C=O) were obtained having a melting point of 228–230° C. and a specific rotation $[\alpha]_D^{20}=+113.3°$ (c.=0.5% in chloroform).

The product occurred in the form of white hexagonal crystals and was insoluble in water and slightly soluble in ether.

*Analysis.*—$C_{18}H_{22}O_4$; molecular weight=302.36—Calculated: C, 71.50%; H, 7.33%; O, 21.17%. Found: C, 71.4%; H, 7.3%; O, 20.9%.

*Step B: Reduction.*—While agitating at room temperature, 5 g. of 11β-hydroperoxy-$\Delta^{4,9}$-estradiene-3,17-dione, II, with R=CH₃ and A=>C=O, were introduced into 25 cc. of methanol. Then 2.5 cc. of trimethyl phosphite were slowly added. The reaction mixture was agitated for a period of ½ hour at room temperature, then poured into a mixture of water and ice containing 5% by volume of perhydrol. The mixture was allowed to stand for 15 minutes at 0° C., then extracted with methylene chloride. The extracts were dried and evaporated to dryness under an atmosphere of nitrogen.

The product obtained was dissolved in ethyl acetate, heated to reflux and cooled to 0° C. The precipitate was vacuum filtered, washed with ethyl acetate and dried. The mother liquors from the crystallization step were distilled and 0.57 g. of product were recovered. In total, 3.88 g. of $\Delta^{4,9}$-estradiene-11β-ol-3,17-dione (III, R=CH₃ and A=>C=O), were obtained having a melting point of 178–179° C., and a specific rotation $[\alpha]_D^{20}=+84.4°$ (C.=0.5% in chloroform).

The product was white, insoluble in water and soluble in alcohol.

*Analysis.*—$C_{18}H_{22}O_3$; molecular weight=286.36—Calculated: C, 75.49%; H, 7.74%. Found: 75.3%, H, 7.7.

This compound is not described in the literature.

By action of acetic acid anhydride in pyridine, the corresponding actate of this product, 11β-acetoxy-$\Delta^{4,9}$-estradiene-3,17-dione was produced having a melting point of 156° C. and a specific rotation $[\alpha]_D^{20}=+68°$ (c.=0.4% in chloroform). This product is not described in the literature.

Example II

PREPARATION OF THE $\Delta^{4,9}$-ESTRADIENE-11β,17β-DIOL-3-ONE

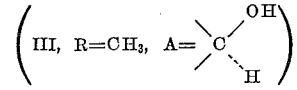

*Step A: Oxidation.*—2 g. of $\Delta^{5(10),9(11)}$-estradiene-17β-ol-3-one,

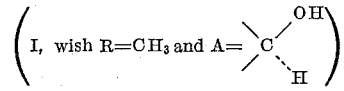

as described in United States Patent No. 3,052,672, were dissolved in 10 cc. of absolute ethanol and 1 cc. of triethylamine while agitating. A stream of oxygen was allowed to bubble through the solution for a period of two hours at ambient temperature while maintaining the agitation. The mixture was cooled to −10° C. The precipitate was vacuum filtered, washed by trituration in absolute ethanol and vacuum filtered. 1,275 g. of product were obtained.

The product obtained was dissolved in 6 volumes of absolute ethanol, heated to reflux, filtered while hot and cooled to −10° C. The precipitate was vacuum filtered, and washed with iced ethanol. 11β-hydroperoxy-$\Delta^{4,9}$-estradiene-17β-ol-3-one

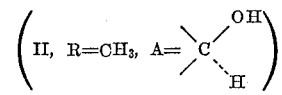

were obtained, having a melting point of 202–207° C. and a specific rotation $[\alpha]_D^{20}=-61° \pm1°$ (c.=0.5% in dimethylformamide), with a yield on the recrystallization step of 85%.

The product occurred in the form of white plateletts, and was insoluble in water and slightly soluble in ether, isopropyl ether, ethanol, cold acetone and hot chloroform.

*Analysis.*—$C_{18}H_{24}O_4$; molecular weight=304.37—Calculated: C, 71.02%; H, 7.95%. Found: C, 71.1%, H, 8.0.

*Step B: Reduction.*—2 g. of 11β-hydroperoxy-$\Delta^{4,9}$-estradiene-17β-ol-3-one

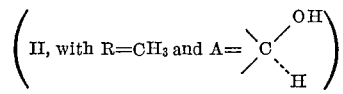

were placed in suspension in 10 cc. of methanol. The suspension was agitated at room temperature, then 1.5 cc. of trimethyl phosphite were rapidly added. The reaction mixture was energetically cooled and the temperature was maintained at about 20–22° C. for a period of 45 minutes. This mixture was then poured on a mixture of water and ice containing 5% of perhydrol and extracted with methylene chloride. The extracts were filtered and evaporated to dryness. The residual product was crystallized by trituration in 10 cc. of isopropyl ether. The crystals were vacuum filtered and rinsed. 1.39 g. of product were obtained.

The product obtained was recrystallized from 25 volumes of ethyl acetate, then from 18 volumes of acetone. $\Delta^{4,9}$-estradiene-11$\beta$,17$\beta$-diol-3-one

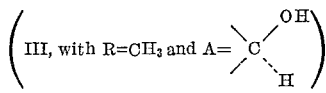

were obtained with a yield of 84.2% for the recrystallization steps.

The product occurred in form of white hexagonal prisms, insoluble in water, slightly soluble in ether, acetone and ethyl acetate and soluble in alcohol.

*Analysis.*—$C_{18}H_{24}O_3$; molecular weight=288.37—Calculated: C, 74.96%; H, 8.39%. Found: C, 74.8; H, 8.2.

This compound is not described in the literature.

*Example III*

PREPARATION OF 17$\beta$-BENZOYLOXY-$\Delta^{4,9}$-ESTRADIENE-11$\beta$-OL-3-ONE

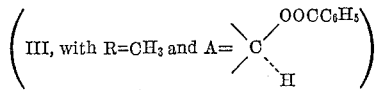

*Step A: Oxidation.*—3.75 g. of 17$\beta$-benzoyloxy-$\Delta^{5(10),9(11)}$-estra-diene-3-one,

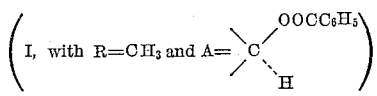

described in United States Patent No. 3,052,672, were introduced into 40 cc. of ethanol containing 1% of triethylamine while agitating. Under continuous agitation, a stream of oxygen was allowed to bubble through the solution for a period of 2 hours at room temperature. Then, the solution was cooled to —10° C. The precipitate formed was vacuum filtered and washed with ethanol cooled to —10° C. After drying, 2.85 g. of 11$\beta$-hydroperoxy-17$\beta$-benzoyloxy-$\Delta^{4,9}$-estradiene-3-one

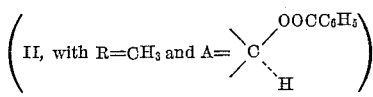

were isolated.

The product occurred in form of colorless crystals, insoluble in water, slightly soluble in ether and ethanol, and soluble in dimethyl formamide.

*Step B: Reduction.*—2 g. of 11$\beta$-hydroperoxy-17$\beta$-benzoyloxy-$\Delta^{4,9}$-estradiene-3-one

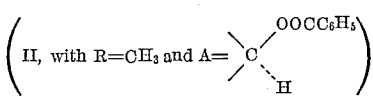

were placed in suspension in 10 cc. of methanol. Then 1.5 cc. of trimethylphosphite were added slowly under agitation. Next, the reaction mixture was heated to reflux for a period of 30 minutes. The mixture was cooled and poured into a mixture of water and ice containing 5% by volume of perhydrol. The mixture was allowed to stand for a period of 15 minutes, then extracted with methylene chloride. The combined extracts were washed with water, dried and evaporated to dryness. 1.45 g. of 17$\beta$-benzoyloxy-$\Delta^{4,9}$-estradiene-11$\beta$-ol-3-one

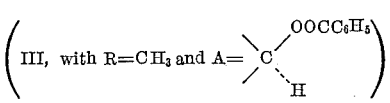

were isolated.

The product occurred in form of colorless crystals, insoluble in water, slightly soluble in ether, and soluble in methylene chloride.

This compound is not described in the literature.

*Example IV*

PREPARATION OF 17$\alpha$-ETHYNYL-$\Delta^{4,9}$-ESTRADIENE-11$\beta$,17$\beta$-DIOL-3-ONE

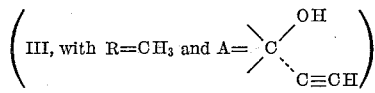

*Step A: Oxidation.*—9 g. of 17$\alpha$-ethynyl-$\Delta^{5(10),9(11)}$-estradiene-17$\beta$-ol-3-one

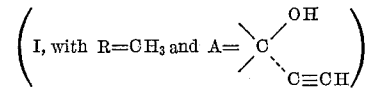

as described in United States Patent No. 3,033,856, were introduced into 45 cc. methanol containing 1% of triethylamine at room temperature and oxygen was allowed to bubble therethrough for a period of two hours, while agitating the suspension formed. After the reaction was completed, the reaction mixture cooled to about —10° to —12° C. for a half hour. The precipitate was vacuum filtered, washed with methanol and dried. 7.7 g. of 11$\beta$-hydroperoxy-17$\alpha$-ethynyl-$\Delta^{4,9}$-estradiene-17$\beta$-ol-3-one

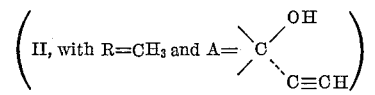

were obtained, solvated with one mol of methanol. The product had a specific rotation $[\alpha]_D^{20}=-18.8°$ (c.=0.2% in methanol).

The product occurred in form of white crystals, insoluble in water, slightly soluble in ether, and soluble in chloroform and ethanol. It desolvated at 130° C. and melted at 170–172° C.

*Analysis*: $C_{20}H_{24}O_4$; molecular weight=328.39. Calculated with 1 mol of methanol: $C_{21}H_{28}O_5$; molecular weight=360.43. Calculated for the solvated product= C, 69.97%; H, 7.83%. Found: C, 69.9%; H, 7.9.

*Step B: Reduction.*—4 g. 11$\beta$-hydroperoxy-17$\alpha$-ethynyl-$\Delta^{4,9}$-estradiene-17$\beta$-ol-3-one

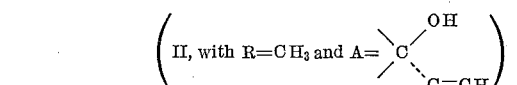

solvated with 1 mol of methanol, were placed in suspension in 20 cc. of ethanol. 2 cc. of triethylphosphite were added and the reaction mixture was heated to reflux for 1 hour. Next, the mixture was cooled to room temperature. 4 cc. of hydrogen peroxide and 4 cc. of water were added, then the reaction mixture was allowed to stand for 1 hour at room temperature.

Next, the mixture was poured into water and extracted with methylene chloride. The extracts were washed with water, dried and evaporated to dryness. The residue was crystallized from isopropyl ether and yielded 2.66 g. of 17$\alpha$-ethynyl-$\Delta^{4,9}$-estradiene-11$\beta$-diol-3-one.

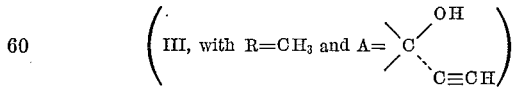

having a melting point of 174° C. and a specific rotation $[\alpha]_D^{20}=-41.5°$ (c.=0.5% in methanol).

The product occurred in form of white crystals, insoluble in ether, slightly soluble in benzene and soluble in alcohols, acetone and chloroform.

U.V. spectra (in ethanol):

Inflection toward 251 m$\mu$ $E_{1\,cm.}^{1\%}=147$

Max. 297–298 m$\mu$ $E_{1\,cm.}^{1\%}=645$

*Analysis.*—$C_{20}H_{24}O_3$; molecular weight=312.39—Calculated: C, 76.89%; H, 7.74%. Found: C, 76.8%; H, 8.0%.

This compound is not described in the literature.

Example V

PREPARATION OF THE 17α-ETHYNYL-Δ⁴,⁹-ESTRADIENE-11β,17β-DIOL-3-ONE

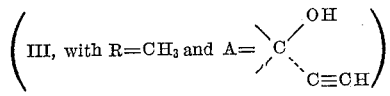

*Step A: Oxidation.*—3.5 g. of 17α-ethynyl-Δ⁵⁽¹⁰⁾,⁹⁽¹¹⁾-estradiene-17β-ol-3-one

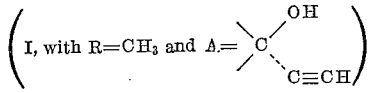

were dissolved in 35 cc. of ethanol containing 1% of triethylamine at room temperature. A stream of oxygen was allowed to bubble through the solution for 2 hours while agitating. The reaction mixture was then evaporated to dryness under vacuum. The residue was crystallized from isopropyl ether by trituration. After washing with ether and drying, 3.9 g. of white crystals of 11β-hydroperoxy-17α-ethynyl-Δ⁴,⁹-estradiene-17β-ol-3-one

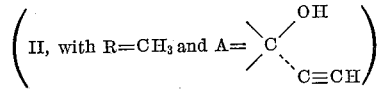

were obtained, which were utilized as such for the next step of the synthesis.

*Step B: Reduction.*—4 g. of 11β-hydroperoxy-17α-ethynyl-Δ⁴,⁹-estradiene-17β-ol-3-one

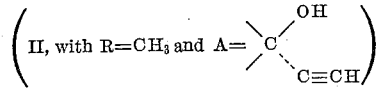

were dissolved in 20 cc. of methanol. 2 cc. of trimethyl phosphite were added while cooling the mixture to room temperature. The mixture was then agitated for a quarter of an hour. Thereafter, it was poured into a mixture of iced water and a 30% hydrogen peroxide aqueous solution, agitated for half an hour, and then extracted with methylene chloride. The organic extract was dried and concentrated in order to obtain a volume of 40 cc. of starting hydroperoxide, under an atmosphere of nitrogen.

12 g. of alumina were added to the concentrated extract, which was thereafter decanted and evaporated to dryness. The oil obtained was triturated with ether. The precipitate was vacuum filtered, washed with ether and dried. 4 g. of 17α-ethynyl-Δ⁴,⁹-estradiene-11β,17β-diol-3-one

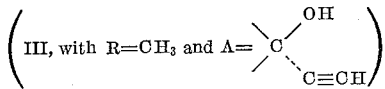

was obtained, which product occurred in form of a solvate. By heating to 105–110° C. under vacuum, the desolvated product was obtained, which was recrystallized from acetonitrile. The purified product melted at 173–174° C. and had a specific rotation $[α]_D^{20} = -41.5 ± 1°$ (c.=0.5% in methanol), identical with the product described in the preceding example.

Example VI

PREPARATION OF 17α-METHYL-Δ⁴,⁹-ESTRADIENE-11β,17β-DIOL-3-ONE

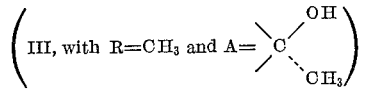

*Step A: Oxidation.*—3 g. of 17α-methyl-Δ⁵⁽¹⁰⁾,⁹⁽¹¹⁾-estradiene-17β-ol-3-one

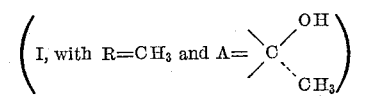

as described in United States Patent No. 3,118,919, were dissolved in 30 cc. of ethanol containing 1% of triethylamine. A stream of oxygen was allowed to bubble through the agitated solution for 2 hours at room temperature. The reaction mixture was then evaporated to dryness under vacuum. A solid residue was obtained which was crystallized by trituration with isopropyl ether. After vacuum filtering, washing and drying, 2.9 g. of 11β-hydroperoxy-17α-methyl-Δ⁴,⁹-estradiene-17β-ol-3-one

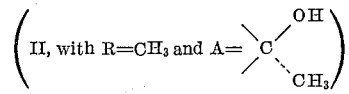

were isolated. This product was utilized as such for the following step of the synthesis.

*Step B: Reduction.*—2 g. of 11β-hydroperoxy-17α-methyl-Δ⁴,⁹-estradiene-17β-ol-3-one

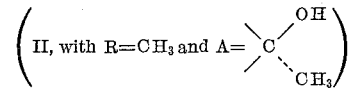

were introduced into 10 cc. of methanol, then 1.5 cc. of trimethyl phosphite were slowly added while agitating and cooling to room temperature. After the addition was complete, the mixture was agitated for a further 15 minutes, then poured into a mixture of iced water and 30% hydrogen peroxide aqueous solution. This mixture was agitated for half an hour and extracted with methylene chloride. The combined extracts were washed with water, dried and concentrated under vacuum. The oil obtained was crystallized by trituration with ether. The precipitate was vacuum filtered, washed with ether and dried under vacuum. Thus 1.75 g. of 17α-methyl-Δ⁴,⁹-estradiene-11β,17β-diol-3-one

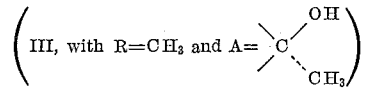

were isolated in form of colorless crystals. This compound is not described in the literature.

Example VII

Preparation of the 17α-ethyl-Δ⁴,⁹-estradiene-11β,17β-diol-3-one

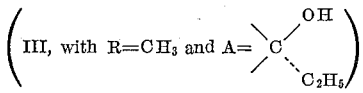

*Step A: Oxidation.*—1.8 g. of 17α-ethyl-Δ⁵⁽¹⁰⁾,⁹⁽¹¹⁾-estradiene-17β-ol-3-one

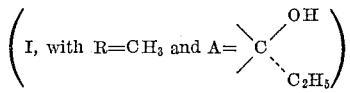

(prepared in the same manner as the corresponding 17α-methyl compound of the preceding example), were introduced into 20 cc. of ethanol containing 1% of triethylamine and a stream of oxygen was allowed to bubble through the agitated solution for a period of 2 hours at room temperature. The reaction mixture was then evaporated to dryness under vacuum and a semi-solid residue was obtained. This residue was triturated with isopropyl ether. The crystallized product obtained was vacuum filtered and dried. Thus, 1.4 g. of 11β-hydroperoxy-17α-ethyl-Δ⁴,⁹-estradiene-17β-ol-3-one

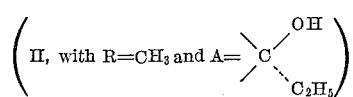

were isolated. The product was used as such for the following step of the synthesis.

Step B: Reduction.—1.2 g. of 11β-hydroperoxy-17α-ethyl-Δ⁴,⁹-estradiene-17β-ol-3-one

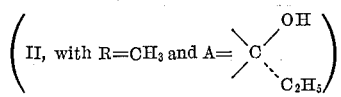
(II, with R=CH₃ and A= $\mathrm{C}{<}^{OH}_{C_2H_5}$)

were added to 6 cc. of methanol, then 0.6 cc. of trimethyl phosphite were slowly added while agitating and maintaining the temperature at about 20° C. The agitation was continued for a half an hour after the addition was completed, then the reaction mixture was poured into a mixture of iced water and 30% hydrogen peroxide aqueous solution. Thereafter, the mixture was agitated for 30 minutes, then extracted with methylene chloride. The combined extracts were washed with water, dried and concentrated under vacuum. A resin was thus obtained, which crystallized by addition of ether. The crystals were vacuum filtered, washed with ether and dried under vacuum. In this manner, 0.75 g. of 17α-ethyl-Δ⁴,⁹-estradiene-11β,17β-diol-3-one

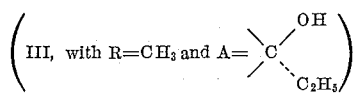
(III, with R=CH₃ and A= $\mathrm{C}{<}^{OH}_{C_2H_5}$)

were isolated in the form of colorless crystals, insoluble in water, slightly soluble in ether, and soluble in methylene chloride. This compound is not described in the literature.

As it was indicated above, the compounds of the general Formula III, obtained by following the process of the invention, show interesting pharmacological properties. They possess, in particular, an important hypocholesterolemic action.

For example, Δ⁴,⁹-estradiene-11β-ol-3,17-dione (III, with R=CH₃ and A=>C=O) and 17α-ethynyl-Δ⁴,⁹-estradiene-11β,17β-diol-3-one

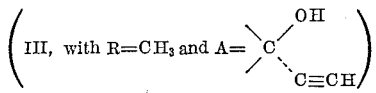
(III, with R=CH₃ and A= $\mathrm{C}{<}^{OH}_{C{\equiv}CH}$)

as well as other compounds of the general Formula III, can be utilized in warm-blooded animals for the treatment of hypercholesterolemia, for the prevention or the treatment of atheromatosis and of circulatory disorders resulting therefrom.

The useful dosology is controlled between 0.1 mg./kg. and .5 mg./kg. in the warm-blooded animal as a function of the method of administration.

The 17-substituted-Δ⁴,⁹-estradiene-11β-ol-3-ones are utilized orally, subcutaneously or rectally.

They must be prepared in the form of injectable solutions or suspensions, made up in ampoules or in phials of multiple doses; in the form of tablets or coated tablets or in the form of suppositories.

The pharmaceutical forms such as injectable solutions or suspensions, tablets, coated tablets and suppositories are prepared according to the usual processes.

The unitary dose is comprised between 5 and 15 mg.

*Example VIII*

A. Pharmacological study of 17α-ethynyl - Δ⁴,⁹-estradiene-11β,17β-diol-3-one

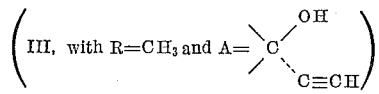
(III, with R=CH₃ and A= $\mathrm{C}{<}^{OH}_{C{\equiv}CH}$)

(1) *Hypocholesterolemic action in the female rat.*— This test was conducted on groups of female rats having an average weight of 200 gm. The medicine being studied utilized in aqueous suspension was administered to the said female rats at daily doses of 1.2 and 5 mg./kg. for a period of 10 days. Two tests were effected at each dosage level. One group of female rats of the same age and weight served as controls. Samples of blood were taken the 11th day in order to determine the amount of seric sterols. The animals were sacrificed the 11th day and the following organs: liver, kidneys and suprarenals, were separated and weighed.

The following table gives the results obtained.

TABLE II.—HYPOCHOLESTEROLEMIC ACTION IN THE FEMALE RAT

|  | Doses, mg./kg. | Seric sterols, gm./1,000 | Suprarenals, mg. | Liver, gm. percent gm. | Kidney, mg. percent gm. |
|---|---|---|---|---|---|
| Controls | 0 | 0.68 | 55.4 | 4.92 | 768 |
| Treated | 1 | 0.51 (−25%) | 59.8 (+7%) | 4.76 | 736 |
| Treated | 2 | 0.46 (−32%) | 53.2 (−4%) | 4.50 | 755 |
| Controls | 0 | 0.64 | 47.7 |  | 710 |
| Treated | 1 | 0.37 (−42%) | 58.6 (+23%) |  | 746 |
| Treated | 2 | 0.40 (−38%) | 63.3 (+33%) |  | 730 |
| Controls | 0 | 0.62 | 52.5 | 4.25 | 714 |
| Treated | 5 | 0.33 (−47%) | 63.5 (+21%) | 4.42 | 736 |
| Controls | 0 | 0.63 | 49.5 | 4.26 | 731 |
| Treated | 5 | 0.31 (−51%) | 51.8 (+5%) | 4.34 | 705 |

(2) *Hypocholesterolemic action on the male rat.*— This test was conducted on groups of male rats of an average weight of 300 gm. under the same conditions as utilized precedingly at doses of 1 and 2 mg./kg.

The following organs: liver, kidneys, suprarenals, seminal vesicules and prostate were separated and weighed.

The following table gives the results obtained:

TABLE III

|  | Doses, mg./kg. | Seric sterols, gm./1,000 | Suprarenals, mg. | Seminal vesicules, mg. | Prostate, mg. | Liver, gm. percent gm. | Kidneys, mg. percent gm. |
|---|---|---|---|---|---|---|---|
| Controls | 0 | 0.66 | 51.8 | 587 | 259 | 3.92 | 723 |
| Treated | 1 | 0.61 (−8%) | 42.4 (−18%) | 577 (−2%) | 388 (+50%) | 4.14 | 696 |
| Treated | 2 | 0.46 (−30%) | 47.5 (−8%) | 578 (−2%) | 317 (+22%) | 4.03 | 740 |

One can thus see that in the female rat, the product studied exercised a clear hypocholesterolemic action starting from 2 mg./kg. In the male rat the hypocholesterolemic action is less clear. On the other hand, it can be noted that the medicine has no action on the liver and the kidneys.

(3) *Hypocholesterolemic activity in the aged rat.*— Aged rats normally present a cholesterolemia superior to that of young rats. This cholesterolemia can easily surpass 1 gm. per thousand, whereas in young adult animals this value is situated at about 0.70 gm. per thousand.

It is thus interesting to utilize these aged animals in order to study the hypocholesterolemic action of the product.

The technique utilized was the following: the cholesterol level was previously determined in aged male rats of an average weight of 500 gm. The animals whose cholesterolemia was more elevated were retained for the experimentation and grouped in two lots. One lot served as control, the other received orally and for a period of 15 days the product to be studied administered at a daily dose of 1 mg./kg. It can be noted that the medicine exercised a clear hypocholesterolemic effect. There was determined after 15 days of treatment a significant lowering of the seric sterol levels of 29%.

(4) *Estrogenic activity—Allen and Doisy Test.*—17α-ethynyl-Δ$^{4,9}$-estradiene-11β,17β-diol-3-one, utilized in suspension in an aqueous liquid dispersant, was administered orally to some groups of castrated female rats. A single administration was utilized at doses of 1 and 5 mg. per animal.

Vaginal smears were taken each day starting from the second day of treatment and for a period of 7 consecutive days. Only those smears formed exclusively of keratinized cells were retained as positive.

At the 1 mg. dosage level, no estrus was observed. At the considerable dosage level of 5 mg. there was noted only estrus for 4 rats out of 6.

The product thus manifests in the Allen-Doisy test only a low estrogenic activity.

(5) *Determination of toxicity.*—17α-ethynyl-Δ$^{4,9}$-estradiene-11β,17β-diol-3-one, utilized in suspension in an aqueous dispersant, was administered orally at a dose of 100 mg./kg. to a group of mice of the Rockland strain weighing 20 gm. on the average.

The animals were held under observation for a period of 8 days. There was noted no symptomatology nor any mortality.

17α-ethynyl-Δ$^{4,9}$-estradiene-11β,17β-diol-3-one is thus devoid of toxicity in the mouse under acute conditions at a dose of 100 mg./kg. administered orally.

*Example IX*

HYPOCHOLESTEROLEMIC ACTIVITY OF Δ$^{4,9}$-ESTRADIENE-11β-OL-3,17-DIONE (III, WITH R=CH$_3$ and A=>C=O)

The product was administered to a group of female rats having an average weight of 200 gm. in suspension in an aqueous dispersant at a daily dose of 5 mg./kg. for a period of 10 days. Administration was subcutaneously.

There was noted at this dosage level a diminuation of the cholesterol level of 35%. Additionally, there was noted no action on the hepatic sterols nor formation of desmosterol in the serum.

The preceding specific embodiments of the invention are illustrative of the principles involved. It is to be understood that other expedients known to those skilled in the art may be employed without departing from the body of the invention or the scope of the appended claims.

We claim:

1. 11β-hydroxy steroids selected from the group consisting of compounds of the formula

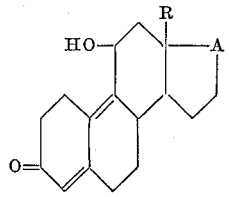

wherein R is a lower alkyl and A is a divalent linkage selected from the group consisting of

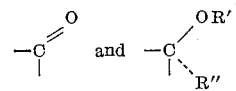

R' is a member selected from the group consisting of hydrogen and the acyl radical of an organic carboxylic acid having from 1 to 18 carbon atoms and R" is a member selected from the group consisting of hydrogen, lower alkenyl and lower alkynyl.

2. Δ$^{4,9}$-estradiene-11β-ol-3,17-dione.
3. 11β-acetoxy-Δ$^{4,9}$-estradiene-3,17-dione.
4. 17β-benzoyloxy-Δ$^{4,9}$-estradiene-11β-ol-3-one.
5. 17α-ethynyl-Δ$^{4,9}$-estradiene-11β,17β-diol-3-one.
6. Δ$^{4,9}$-estradiene-11β,17β-diol-3-one.

7. A process for the production of 11β-hydroxy steroids selected from the group consisting of compounds of the formula

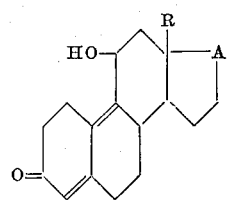

wherein R is a lower alkyl and A is a divalent linkage selected from the group consisting of

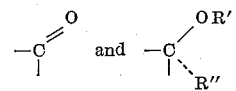

R' is a member selected from the group consisting of hydrogen and the acyl radical of an organic carboxylic acid having from 1 to 18 carbon atoms and R" is a member selected from the group consisting of hydrogen, lower alkenyl and lower alkynyl which comprises the steps of oxidizing a compound of the formula

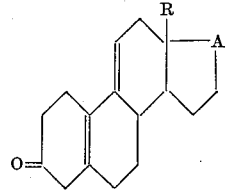

wherein R and A have the above-noted meanings by the action of an oxygen-containing gas in the presence of a weakly alkaline media in an inert organic solvent, reducing the compound of the formula

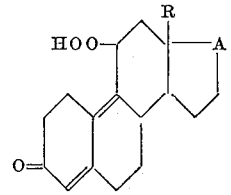

wherein R and A have the above-noted meanings, by the action of tri-lower alkyl phosphate in a lower alkanol solvent, and recovering said 11β-hydroxy steroids.

8. The process of claim 7 wherein said oxidation is effected in the presence of an amine compound selected from the group consisting of tri-lower-alkyl-amines, tertiary cyclic amines, and organic acid derivatives of quaternary ammonium compounds, as said weakly alkaline media.

9. The process of claim 7 wherein said oxidation is effected in the presence of an inert organic solvent selected from the group consisting of lower alkanols, N,N-di-lower-alkyl-lower-alkanoyl-amides and mixtures thereof.

10. A process for the production of 17α-ethynyl-Δ$^{4,9}$-estradiene-11β,17β-diol-3-one which comprises the steps of oxidizing 17α-ethynyl-Δ$^{5(10),9(11)}$-estradiene-17β-ol-3-one by the action of an oxygen-containing gas in the presence of a tri-lower-alkyl-amine in a lower alkanol solvent, reducing the 11β-hydroperoxy-17α-ethynyl-Δ$^{4,9}$-estradiene-17β-ol-3-one by the action of a tri-lower-alkyl phosphite in a lower alkanol solvent and recovering said 17α-ethynyl-Δ$^{4,9}$-estradiene-11β,17β-diol-3-one.

11. A process for the production of Δ$^{4,9}$-estradiene-11β-ol-3,17-dione which comprises the steps of oxidizing Δ$^{5(10),9(11)}$-estradiene-3,17-dione by the action of an oxygen-containing gas in the presence of a tri-lower-alkyl-amine in a lower-alkanol solvent, reducing the 11β-hydroperoxy-Δ$^{4,9}$-estradiene-3,17-dione by the action of a tri-lower-alkyl phosphite in a lower alkanol solvent and recovering said Δ$^{4,9}$-estradiene-11β-ol-3,17-dione.

12. A process for the production of Δ$^{4,9}$-estradiene-11β,17β-diol-3-one which comprises the steps of oxidizing Δ$^{5(10),9(11)}$-estradiene-17β-ol-3-one by the action of an oxygen-containing gas in the presence of a tri-lower-alkyl-amine in a lower alkanol solvent, reducing the 11β-hydroperoxy-Δ$^{4,9}$-estradiene-17β-ol-3-one by the action of a tri-lower-alkyl phosphite in a lower alkanol solvent and recovering said Δ$^{4,9}$-estradiene-11β,17β-diol-3-one.

13. A process for the production of 17β-benzoyloxy-Δ$^{4,9}$-estradiene-11β-ol-3-one which comprises the steps of oxidizing 17β-benzoyloxy-Δ$^{5(10),9(11)}$-estradiene-3-one by the action of an oxygen-containing gas in the presence of a tri-lower-alkyl-amine in a lower alkanol solvent, reducing the 11β-hydroperoxy-17β-benzoyloxy-Δ$^{4,9}$-estradiene-11β-ol-3-one by the action of a tri-lower-alkyl phosphite in a lower alkanol solvent and recovering said 17β-benzoyloxy-Δ$^{4,9}$-estradiene-11β-ol-3-one.

14. A process for the production of 17α-methyl-Δ$^{4,9}$-estradiene-11β,17β-diol-3-one which comprises the steps of oxidizing 17α-methyl-Δ$^{5(10),9(11)}$-estradiene-17β-ol-3-one by the action of an oxygen-containing gas in the presence of a tri-lower-alkyl-amine in a lower alkanol solvent, reducing the 11β-hydroperoxy-17α-methyl-Δ$^{4,9}$-estradiene-17β-ol-3-one by the action of a tri-lower-alkyl phosphite in a lower alkanol solvent and recovering said 17α-methyl-Δ$^{4,9}$-estradiene-11β,17β-diol-3-one.

15. A process for the production of 17α-ethyl-Δ$^{4,9}$-estradiene-11β,17β-diol-3-one which comprises the steps of oxidizing 17α-ethyl-Δ$^{5(10),9(11)}$-estradiene-17β-ol-3-one by the action of an oxygen-containing gas in the presence of a tri-lower-alkyl-amine in a lower alkanol solvent, reducing the 11β-hydroperoxy-17α-ethyl-Δ$^{4,9}$-estradiene-17β-ol-3-one by the action of a tri-lower-alkyl phosphite in a lower alkanol solvent and recovering said 17α-ethyl-Δ$^{4,9}$-estradiene-11β,17β-diol-3-one.

16. A process for treatment of hypercholesterolemia which comprises administering a safe but effective dose of an 11β-hydroxy steroid selected from the group consisting of compounds of the formula

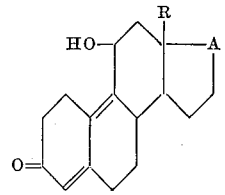

wherein R is a lower alkyl and A is a divalent linkage selected from the group consisting of

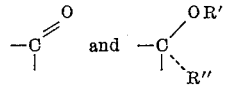

R' is a member selected from the group consisting of hydrogen and the acyl radical of an organic carboxylic acid having from 1 to 18 carbon atoms and R" is a member selected from the group consisting of hydrogen, lower alkenyl and lower alkynyl.

17. Δ$^{5(10),9(11)}$-estradiene-3,17-dione.

18. 3-pyrrolidino-Δ$^{3,5(10),9(11)}$-estradiene-17-one.

References Cited by the Examiner

UNITED STATES PATENTS 3,211,764  10/1965  Brown et al. _____ 260—397.45

LEWIS GOTTS, *Primary Examiner.*

ELBERT L. ROBERTS, *Assistant Examiner.*

UNITED STATES PATENT OFFICE
CERTIFICATE OF CORRECTION

Patent No. 3,282,785                                           November 1, 1966

Robert Joly et al.

It is hereby certified that error appears in the above numbered patent requiring correction and that the said Letters Patent should read as corrected below.

Column 5, line 70, for "obtaiend" read -- obtained --; column 6, line 40, for "Unied" read -- United --; column 7, line 2, for "9.04%%" read -- 9.04% --; line 73, for "C.=0.5%" read -- c.=0.5% --; column 8, lines 21 to 25, in the formula, for "I wish R" read -- I with R --; line 34, for "1,275 g." read -- 1.275 g. --; column 9, line 26, for "estra-diene" read -- estradiene --; line 48, for "dimethyl formamide" read -- dimethylformamide --; column 10, line 57, for "11β-diol-3-one" read -- 11β,17β-diol-3-one --; line 69, for "251" read -- 231 --; column 11, line 2, for "of the 17α" read -- of 17α --; column 14, line 3, for "They must be" read -- They may be --; columns 13 and 14, TABLE II, fourth column under the heading, "Suprarenals, mg." line 2, thereof for "(+7%" read -- (+7%) --; column 16, line 63, for "phoshate" read -- phosphite --.

Signed and sealed this 5th day of September 1967.

(SEAL)
Attest:

ERNEST W. SWIDER                                         EDWARD J. BRENNER
Attesting Officer                                    Commissioner of Patents